US009295065B2

(12) United States Patent
Dahod et al.

(10) Patent No.: US 9,295,065 B2
(45) Date of Patent: Mar. 22, 2016

(54) SYSTEMS AND METHODS FOR COORDINATING TRANSMISSION OF DATA PACKETS BASED ON FRAME TYPE DETECTION IN A BASE STATION

(71) Applicant: AltioStar Networks, Inc., Tewksbury, MA (US)

(72) Inventors: Ashraf M. Dahod, Andover, MA (US); Kuntal Chowdhury, Andover, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/185,766

(22) Filed: Feb. 20, 2014

(65) Prior Publication Data

US 2014/0233413 A1  Aug. 21, 2014

Related U.S. Application Data

(60) Provisional application No. 61/767,410, filed on Feb. 21, 2013, provisional application No. 61/767,422, filed on Feb. 21, 2013, provisional application No. 61/804,983, filed on Mar. 25, 2013, provisional application No. 61/804,938, filed on Mar. 25, 2013.

(51) Int. Cl.
*H04L 12/26* (2006.01)
*H04W 4/00* (2009.01)
(Continued)

(52) U.S. Cl.
CPC ............. *H04W 72/08* (2013.01); *H04L 43/028* (2013.01); *H04L 47/2475* (2013.01);
(Continued)

(58) Field of Classification Search
CPC . H04N 13/0048; H04N 17/00; H04N 17/004; H04N 19/13–19/14; H04N 19/40;
(Continued)

(56) References Cited

U.S. PATENT DOCUMENTS 6,982,762 B1 *  1/2006  Hui ...................... H04N 19/159
                                                     348/405.1
7,158,186 B2 *  1/2007  Selby .................... G09G 5/005
                                                     348/441

(Continued)

FOREIGN PATENT DOCUMENTS

EP      2 200 390 A2     6/2010
EP      2 501 141 A2     9/2012
(Continued)

OTHER PUBLICATIONS

Balakrishnan, et al., (1995); "Improving Reliable Transport and Handoff Performance in Cellular Wireless Networks", Wireless Networks, ACM, 1:469-481.
(Continued)

*Primary Examiner* — Tri H Phan
(74) *Attorney, Agent, or Firm* — Mintz Levin Cohn Ferris Glovsky and Popeo, P.C.

(57) ABSTRACT

A system, method, base station, and computer program product for coordinating communication of data packets between a user device and an application server is described. The data packets may correspond to a bit-stream of encoded video data. In one aspect, the base station includes a memory and a computer processor operatively coupled to the memory, to a radio transmitter, and to a radio receiver. The processor is configured to detect a video frame type of the data packets and transmit one or more of the plurality of data packets based on the detected video frame type. For example, the processor may transrate, drop, or schedule the data packet for transmission based on the detected video frame type.

29 Claims, 10 Drawing Sheets

(51) Int. Cl.
| | |
|---|---|
| *H04L 12/28* | (2006.01) |
| *H04H 20/28* | (2008.01) |
| *H04W 72/08* | (2009.01) |
| *H04N 21/61* | (2011.01) |
| *H04N 21/63* | (2011.01) |
| *H04N 21/647* | (2011.01) |
| *H04L 12/859* | (2013.01) |
| *H04L 12/927* | (2013.01) |
| H04N 21/4363 | (2011.01) |
| H04W 28/06 | (2009.01) |
| H04W 72/12 | (2009.01) |

(52) U.S. Cl.
CPC ........... *H04L 47/80* (2013.01); *H04N 21/6131* (2013.01); *H04N 21/631* (2013.01); *H04N 21/64738* (2013.01); *H04N 21/64792* (2013.01); *H04W 72/1257* (2013.01); H04N 21/43637 (2013.01); H04W 28/06 (2013.01); H04W 72/1242 (2013.01)

(58) Field of Classification Search
CPC ....... H04N 19/44; H04N 19/48; H04N 19/61; H04N 19/85; H04N 19/90–19/91; H04N 19/93; H04N 19/103; H04N 19/105; H04N 19/115; H04N 19/119; H04N 19/122; H04N 19/136–19/137; H04N 19/146; H04N 19/149; H04N 19/154; H04N 19/157; H04N 19/159; H04N 19/169; H04N 19/172; H04N 19/174; H04N 19/176; H04N 19/196; H04N 19/513; H04N 19/597; H04N 21/2402; H04N 21/2383; H04N 21/2662; H04N 21/8451; H04N 21/44008; H04N 21/44209; H04N 21/64792; H04N 19/114; H04N 21/631; H04N 21/2343; H04N 21/6131; H04N 21/43637; H04N 21/64738; H01L 1/00; H01L 1/0009; H01L 12/40143; H01L 41/5022; H01L 43/028; H01L 47/10; H01L 47/12; H01L 47/14; H01L 47/20; H01L 47/32; H01L 47/623; H01L 47/2408; H01L 47/2416; H01L 47/2425; H01L 47/2433; H01L 47/2441; H01L 65/80; H01L 65/607; H01L 69/22; H01L 41/5009; H01L 47/24; H01L 47/80; H01L 47/803; H01L 47/805; H01L 47/2475; H04W 28/06; H04W 28/18; H04W 28/24; H04W 72/08; H04W 72/125; H04W 72/1242; H04W 72/1257
USPC ......... 370/229–238, 252, 310–350, 389–401, 370/486–490; 725/105–153
See application file for complete search history.

(56) References Cited

U.S. PATENT DOCUMENTS

| | | | | |
|---|---|---|---|---|
| 7,555,006 | B2* | 6/2009 | Wolfe | H04N 21/234309 |
| | | | | 370/268 |
| 8,396,118 | B2* | 3/2013 | Auyeung | H04N 19/147 |
| | | | | 375/240.01 |
| 8,531,947 | B2 | 9/2013 | Zhao et al. | |
| 8,627,396 | B2* | 1/2014 | Stanwood et al. | 725/116 |
| 9,065,779 | B2* | 6/2015 | Stanwood | H04L 47/623 |
| 2002/0172178 | A1 | 11/2002 | Suzuki et al. | |
| 2003/0235171 | A1 | 12/2003 | Lundstrom et al. | |
| 2006/0072832 | A1* | 4/2006 | Nemiroff et al. | 382/232 |
| 2007/0032198 | A1* | 2/2007 | Sakamoto | H04L 29/06027 |
| | | | | 455/69 |
| 2009/0201813 | A1 | 8/2009 | Speight | |
| 2009/0252148 | A1 | 10/2009 | Dolganow et al. | |
| 2009/0313673 | A1* | 12/2009 | Grozis | 725/118 |
| 2010/0054231 | A1 | 3/2010 | Dolganow et al. | |
| 2010/0062781 | A1 | 3/2010 | Dolganow et al. | |
| 2010/0067489 | A1 | 3/2010 | Pelletier et al. | |
| 2011/0242975 | A1 | 10/2011 | Zhao et al. | |
| 2011/0267951 | A1 | 11/2011 | Stanwood et al. | |
| 2012/0163298 | A1 | 6/2012 | Zhou et al. | |
| 2012/0257581 | A1 | 10/2012 | De | |
| 2012/0300710 | A1 | 11/2012 | Li et al. | |
| 2012/0300747 | A1 | 11/2012 | Westberg et al. | |
| 2013/0051329 | A1 | 2/2013 | Take | |
| 2013/0055331 | A1* | 2/2013 | Karacali-Akyamac | H04L 65/80 |
| | | | | 725/116 |
| 2013/0272181 | A1 | 10/2013 | Fong et al. | |
| 2013/0293673 | A1* | 11/2013 | Hrebien et al. | 348/43 |
| 2014/0226481 | A1 | 8/2014 | Dahod et al. | |
| 2014/0233413 | A1 | 8/2014 | Dahod et al. | |
| 2014/0233459 | A1 | 8/2014 | Dahod et al. | |
| 2014/0233479 | A1 | 8/2014 | Dahod et al. | |

FOREIGN PATENT DOCUMENTS

| | | |
|---|---|---|
| EP | 2 530 988 A1 | 12/2012 |
| WO | WO-2011/080714 A2 | 7/2011 |
| WO | WO-2012/084636 A1 | 6/2012 |
| WO | WO-2012/139016 A2 | 10/2012 |
| WO | WO-2012/139664 A1 | 10/2012 |
| WO | WO-2012/177763 A2 | 12/2012 |
| WO | WO-2013/038167 A2 | 3/2013 |
| WO | WO-2014/127054 A1 | 8/2014 |
| WO | WO-2014/130708 A1 | 8/2014 |
| WO | WO-2014/130709 A1 | 8/2014 |
| WO | WO-2014/130713 A1 | 8/2014 |
| WO | WO-2014/160709 A2 | 10/2014 |
| WO | WO-2014/160718 A1 | 10/2014 |
| WO | WO-2014/160722 A1 | 10/2014 |

OTHER PUBLICATIONS

Border et al., (2001); "Performance Enhancing Proxies Intended to Mitigate Link-Related Degradations", Network Working Group Request for Comments: 3135; pp. 1-45.
Du, et al., (2009); "Downlink Scheduling for Multimedia Multicast/Broadcast over Mobile WiMAX: Connection-Oriented Multistate Adaptation", IEEE Wireless Communications, pp. 72-79.
Yoon, et al., (2012); "MuVi", Mobile Computing and Networking, ACM, pp. 209-220.
International Search Report for PCT/US2014/016123, mailed Jul. 22, 2014.
International Search Report for PCT/US2014/017456, mailed Jul. 3, 2014.
International Search Report for PCT/US2014/017459, mailed Jul. 3, 2014.
International Search Report for PCT/US2014/017464, mailed Jun. 16, 2014.
International Search Report for PCT/US2014/031749, mailed Aug. 5, 2014.
International Search Report for PCT/US2014/031725, mailed Oct. 7, 2014.
International Search Report for PCT/US2014/031744, mailed Sep. 4, 2014.
International Search Report for PCT/US2014/031753, mailed Aug. 14, 2014.

* cited by examiner

SYSTEMS AND METHODS FOR COORDINATING TRANSMISSION OF DATA PACKETS BASED ON FRAME TYPE DETECTION IN A BASE STATION

CROSS-REFERENCE TO RELATED APPLICATIONS

The present application claims priority to U.S. Provisional Patent Application No. 61/767,410 to Dahod et al., filed Feb. 21, 2013, and entitled "Long Term Evolution (LTE) Application Aware Scheduler," U.S. Provisional Patent Application No. 61/767,422 to Dahod et al., filed Feb. 21, 2013, and entitled "Long Term Evolution (LTE) Application Based Idle Timeout," U.S. Provisional Patent Application No. 61/804,938 to Chowdhury et al., filed Mar. 25, 2013, and entitled "Video Frame Aware Scheduler in Evolved Node B," and U.S. Provisional Patent Application No. 61/804,983 to Chowdhury et al., filed Mar. 25, 2013, and entitled "Radio Aware Transrating in an Evolved Node B," and incorporates their disclosure herein by reference in their entirety.

TECHNICAL FIELD

Embodiments of the present subject matter relate to systems and methods for coordinating transmission of data packets based on a detection of an encoded video frame type of the data packet.

SUMMARY OF THE EMBODIMENTS

According to one aspect, a base station for coordinating communication of data packets between a user device and an application server is described. The data packets correspond to a bit-stream of encoded video data. The base station includes a memory and a computer processor operatively coupled to the memory, to a radio transmitter, and to a radio receiver. The processor being configured to detect a video frame type of the data packets and transmit one or more of the plurality of data packets based on the detected video frame type.

In one implementation, the computer processor is further configured to assign resource blocks for transmitting one or more of the plurality of data packets.

In one implementation, the computer processor is configured to inspect data packets and assign resource blocks to data packets upon arrival at the base station.

In one implementation, the computer processor is configured to transmit the data packet to a remote radio head, and wherein the remote radio head comprises the radio transmitter and the radio receiver.

In one implementation, the computer processor is configured to perform a shallow packet inspection of the data packet, and based on the shallow packet inspection, perform a deep packet inspection of the data packet.

In one implementation, the computer processor includes a packet inspection processor configured to inspect at least one of a packet header, a packet payload, and metadata associated with the data packet to determine the video frame of the data packet, and a video frame scheduling processor configured to assign resource blocks for transmitting the one or more data packets based on the detected video frame type.

In one implementation, the computer processor includes a video frame scheduling processor configured to assign resource blocks for transmitting the one or more data packets based on the detected video frame type.

In one implementation, the video frame scheduling processor is configured to assign greater resources for transmitting an I-frame than for a P-frame in the video bit-stream.

In one implementation, the video frame scheduling processor is configured to assign greater resources for transmitting an I-frame than for a B-frame in the video bit-stream.

In one implementation, the computer processor includes a video frame transrating processor configured to determine whether a data packet will be transmitted without modification, transmitted with a reduced bit rate, or removed from the video bit-stream based on the detected video frame type.

In one implementation, the video frame transrating processor is configured to transmit all I-frames in the bit-stream without modification and reduce a bit rate of or drop at least one B-frame from the bit-stream.

In one implementation, the video frame transrating processor is configured to transmit all I-frames in the bit-stream without modification and reduce a bit rate for at least one P-frame from the bit-stream.

In one implementation, the video frame transrating processor is configured to append information identifying whether a data packet may be removed from the bit-stream, and wherein the computer processor further comprises a video frame scheduling processor configured to schedule the data packet for transmission based on detected radio channel conditions at the base station.

According to another aspect, a method for coordinating communication of data packets between a user device and an application server utilizing a base station is described. The data packets corresponding to a bit-stream of encoded video data. The method includes detecting a video frame type of the data packets, and transmitting one or more of the plurality of data packets based on the detected video frame type.

In one implementation, the method includes assigning resource blocks for transmitting one or more of the plurality of data packets.

In one implementation, the method includes inspecting data packets and assigning resource blocks to data packets upon arrival at the base station.

In one implementation, the method includes transmitting the data packet to a remote radio head, and wherein the remote radio head comprises a radio transmitter and a radio receiver.

In one implementation, the method includes performing a shallow packet inspection of the data packet, and based on the shallow packet inspection, performing a deep packet inspection of the data packet.

In one implementation, the method includes determining a radio channel condition, and assigning resource blocks for transmitting the one or more of the plurality of data packets based on the detected video frame type and the radio channel condition.

In one implementation, the method includes assigning greater resources for transmitting an I-frame than for a P-frame in the video bit-stream.

In one implementation, the method includes assigning greater resources for transmitting an I-frame than for a B-frame in the video bit-stream.

In one implementation, the method includes transmitting a data packet without modification, reducing the bit rate of the data packet, or dropping the data packet based on the detected video frame type.

In one implementation, the method includes transmitting all I-frames in the bit-stream without modification and reducing the bit rate of or dropping at least one B-frame from the bit-stream.

In one implementation, the method includes transmitting all I-frames in the bit-stream without modification and reducing a bit rate of at least one P-frame from the bit-stream.

In one implementation, the method includes appending information identifying whether a data packet may be removed from the bit-stream, and scheduling the data packet for transmission based on detected radio channel conditions at the base station.

According to another aspect, a non-transitory computer readable medium having stored thereon a computer program product that is capable of being executed by computer processing circuitry is described. The computer program product including instructions for causing the processing circuitry to detect a video frame type of each of a plurality of data packets in a video bit-stream received by a base station, and transmit one or more of the plurality of data packets based on the detected video frame type.

According to some implementations, radio resource blocks correspond to the smallest elements of resource allocation to users for predetermined amounts of time. According to some implementations, a resource block in an LTE system corresponds to one sub-carrier over one OFDM symbol.

According to some implementations, a deep packet inspection may include an inspection of one or more of layers 1-7 of an open systems interconnect (OSI) model data packet, while a shallow packet inspection may include an inspection of a header and/or data in layer 7 of an OSI model data packet.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU)."

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Some of the embodiments of the present disclosure will be described with reference to the following figures. It should be appreciated that the figures are provided for exemplary purposes. Items appearing in multiple figures are indicated by the same reference number in all the figures in which they appear.

DETAILED DESCRIPTION OF SOME OF THE EMBODIMENTS

The present subject matter generally relates to coordination of packet data transmission in a mobile telecommunication system, and more particularly to a long term evolution (LTE) system for coordinating transmission of data packets corresponding to a video bit-stream based on a detection of an encoded frame type. To address the deficiencies of currently available solutions, one or more implementations of the current subject matter provide long term evolution radio access network having an intelligent capability with respect to the frame type to which various data packets correspond. While the methods and systems described herein are with reference to an LTE system, and in some instances an evolved node B (eNodeB) base station in a radio access network ("RAN") or a centralized cloud radio access network ("C-RAN"), the methods and systems described herein are applicable to other types of communication systems.

An LTE system is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
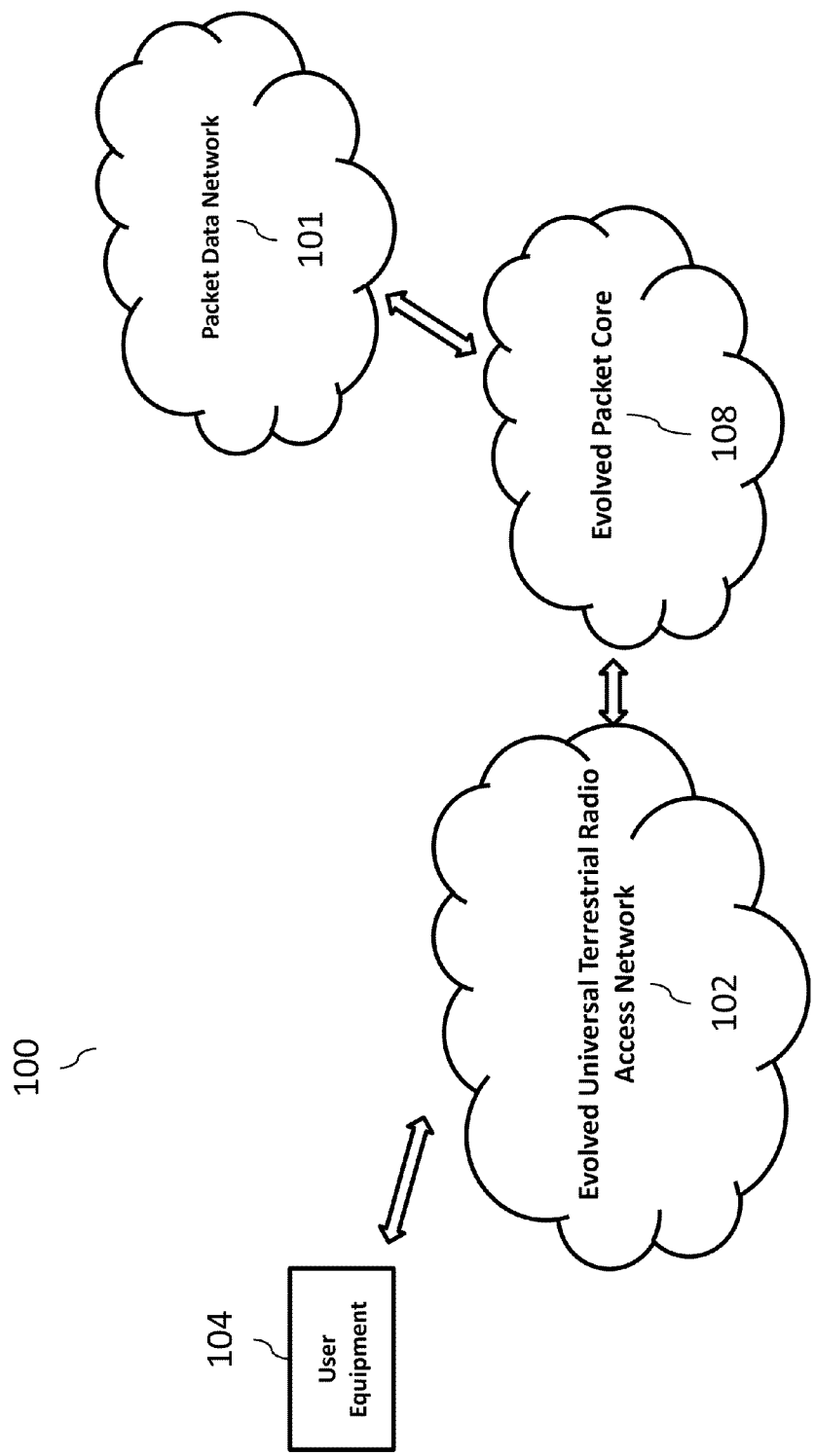
FIG. 1A illustrates an example of a long term evolution ("LTE") communications system.
Figure 1B:
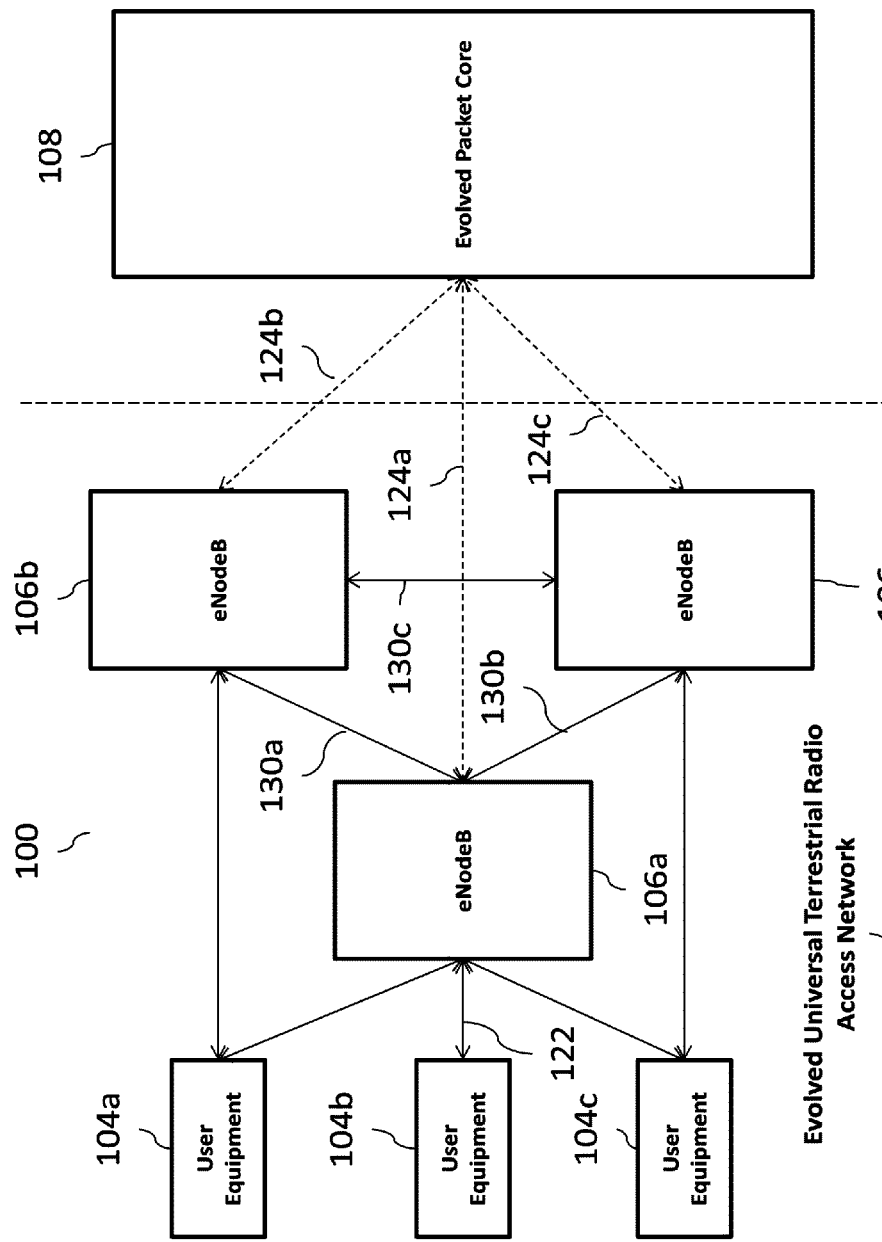
FIG. 1B illustrates example implementations of the LTE system shown in FIG. 1A.

FIG. 1A illustrates an example of a long term evolution ("LTE") communications system 100. FIG. 1B illustrates example implementations of the LTE system shown in FIG. 1A. As shown in FIG. 1A, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENB") or base stations 106 (a, b, c) (as shown in FIG. 1B) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

With reference to FIG. 1B, the EUTRAN 102 may include a plurality of eNodeBs 106, also known as cell sites. The eNodeBs 106 provides radio functions and performs key control functions including scheduling of air link resources or radio resource management, active mode mobility or handover, and admission control for services.

Figure 1C:
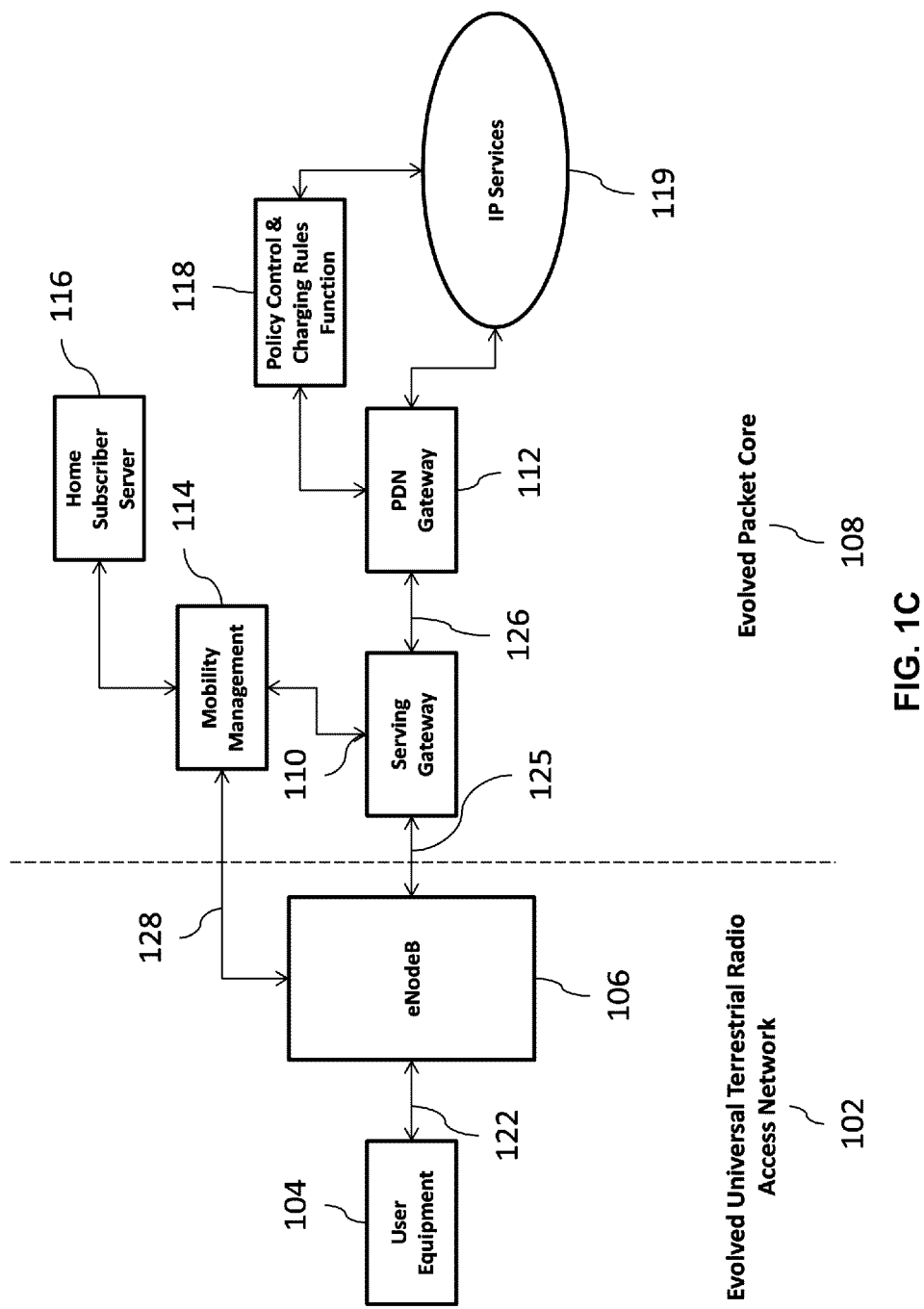
FIG. 1C illustrates an example network architecture of the LTE system shown in FIG. 1A.

FIG. 1C illustrates an example network architecture of the LTE system shown in FIG. 1A. As shown in FIG. 1C, the eNodeBs 106 are responsible for selecting which mobility management entities (MMEs) will serve the user equipment 104 and for protocol features like header compression and encryption. The eNodeBs 106 that make up an EUTRAN 102 collaborate with one another for radio resource management and handover as shown in FIG. 1C.

With reference to FIG. 1C, communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1C) and the other for the user plane (shown as user plane interface (S1-U interface) 125 in FIG. 1C).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1C. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile. As stated above, the IP services 119 are provided by the PDN 101 (as shown in FIG. 1A).

According to some implementations, the LTE network includes splitting the base station functionalities into a baseband unit (BBU), which performs, in particular, the scheduling and the baseband processing functions, and a number of remote radio heads (RRHs) responsible for RF transmission and/or reception of signals. The baseband processing unit is typically located at the center of the cell and is connected via optical fiber to the RHs. This approach allows a baseband processing unit to manage different radio sites in a central manner. Furthermore, having geographically separated RHs controlled from the same location enables either centralized baseband processing units jointly managing the operation of several radio sites, or the exchange of very low-latency coordination messages among individual baseband processing units.

The open base station architecture initiative (OBSAI) and the common public radio interface (CPRI) standards introduced standardized interfaces separating the base station server and the RRH part of a base station by an optical fiber.

Figure 1D:
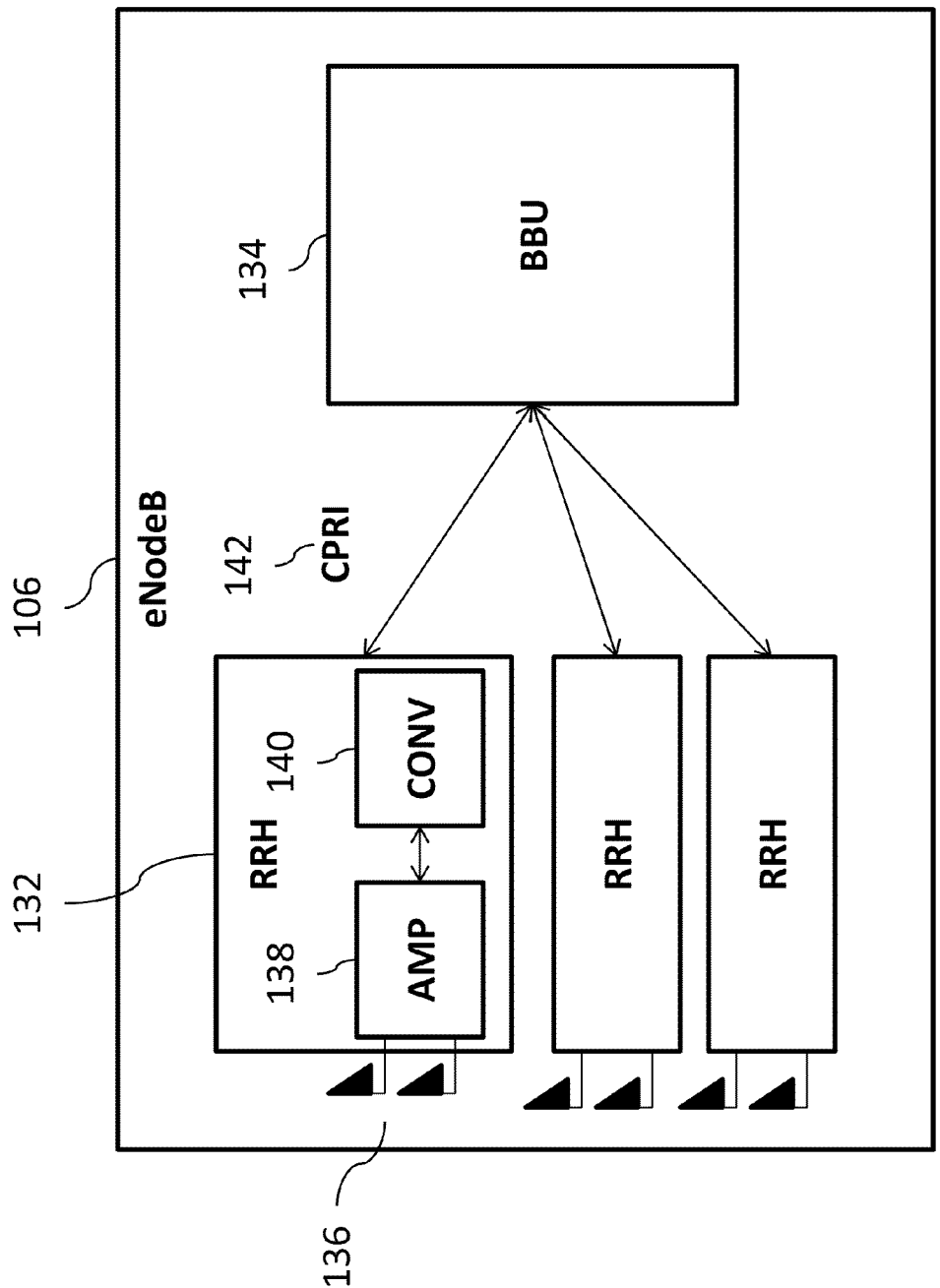
FIG. 1D illustrates an example structure of an evolved node B (eNodeB) base station according to some implementations.

FIG. 1D illustrates an example structure of an evolved node B (eNodeB) base station 106 according to some implementations. The eNodeB 106 can include at least one remote radio head ("RRH") 132 (for example, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using standard parameters and specifications for radio frequency band, bandwidth, access scheme (e.g., downlink: OFDMA; uplink: SC-OFDMA for LTE), antenna technology, number of sectors, maximum transmission rate, S1/X2 interface, and/or mobile environment. For example, these values may be set based on standards and specifications defined for LTE and/or a next generation architecture. The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
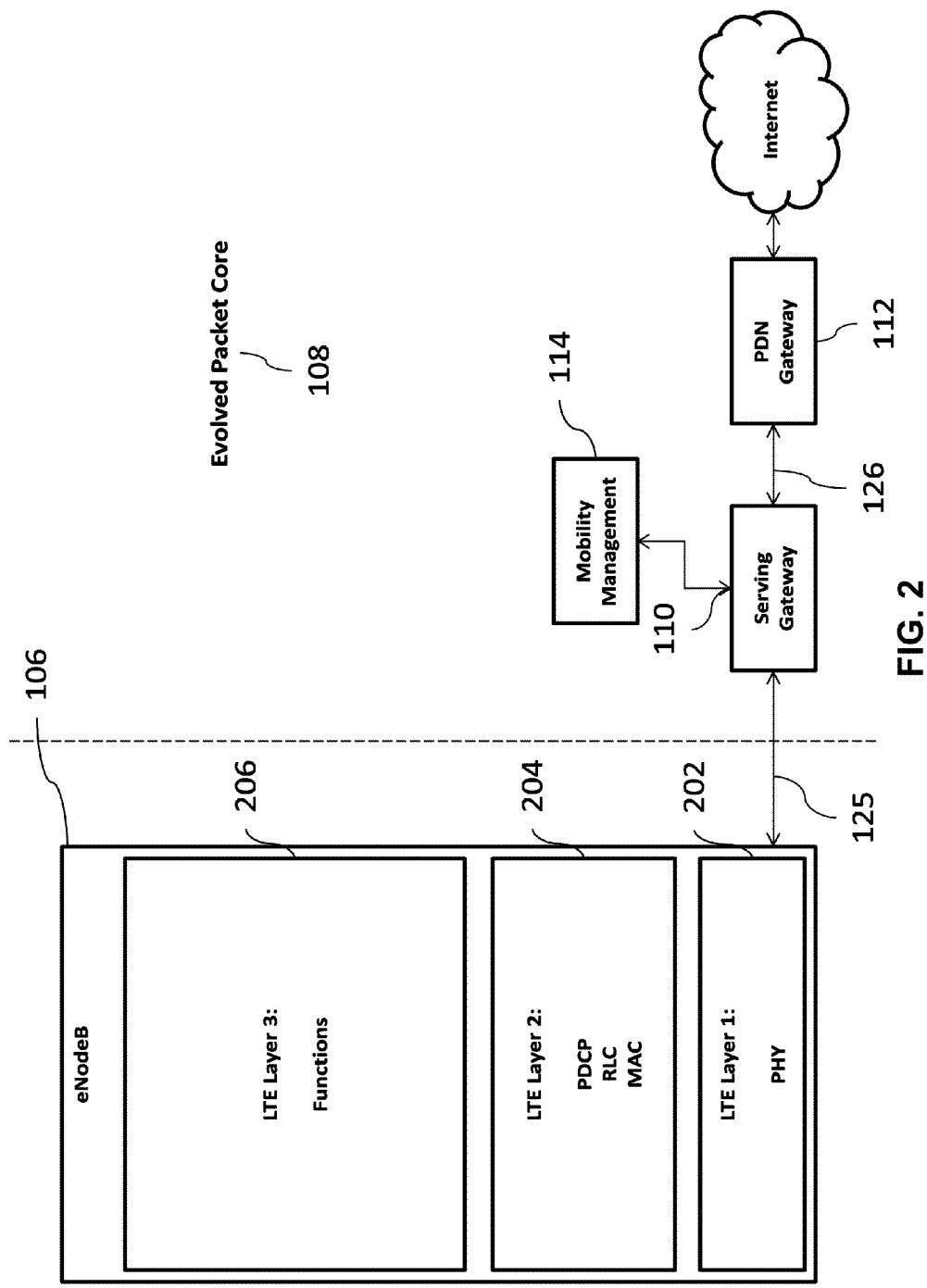
FIG. 2 illustrates an example structure of functional layers of an evolved node B (eNodeB) base station and an interface to a core network of the LTE system shown in FIGS. 1A-1D.

FIG. 2 illustrates an example structure of functional layers of an evolved node B (eNodeB) base station and an interface to a core network of the LTE system shown in FIGS. 1A-1D. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). Each of these layers are discussed in further detail below.

Figure 3:
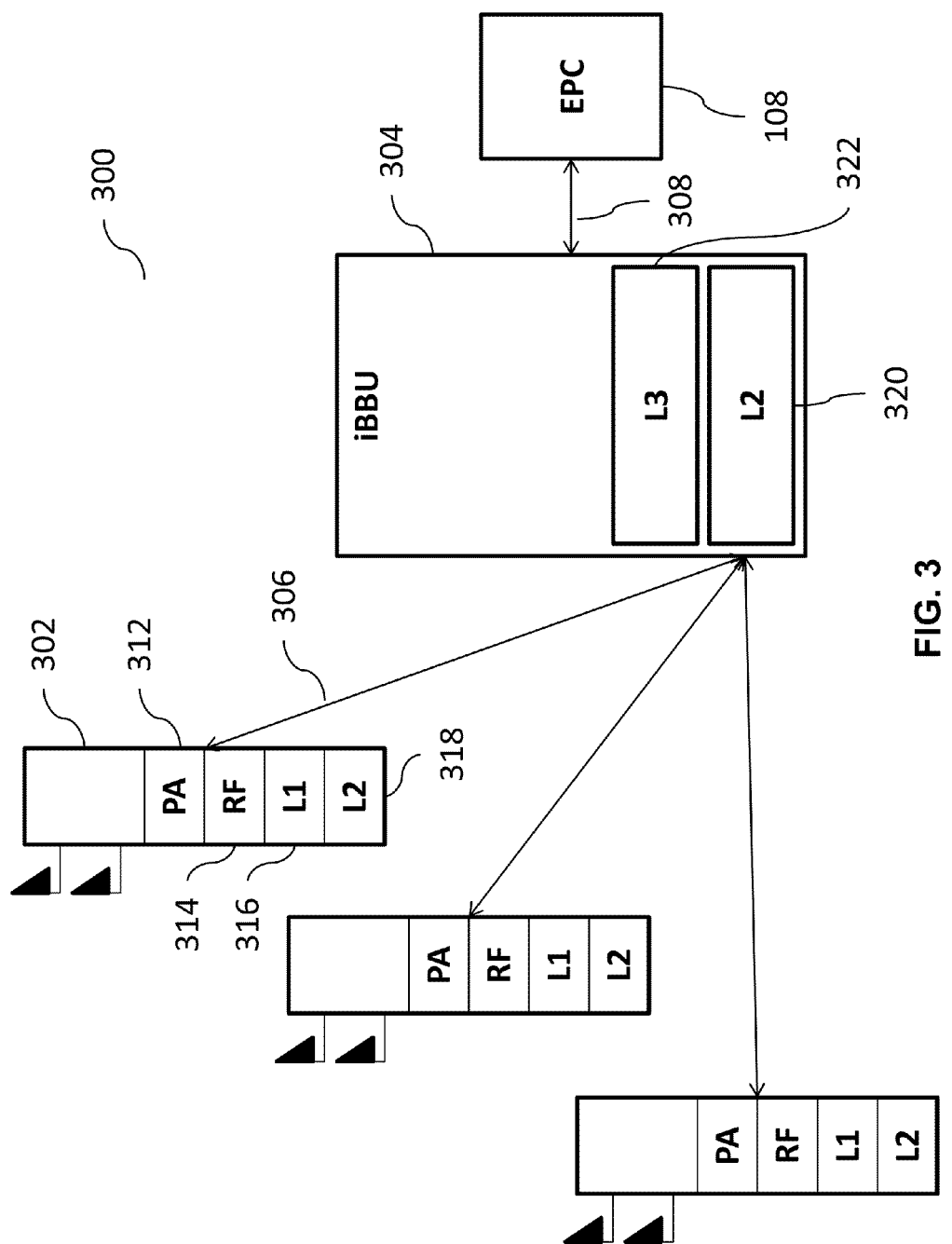
FIG. 3 illustrates another example structure of functional layers of an evolved node B (eNodeB) base station of the LTE system shown in FIGS. 1A-1D.

FIG. 3 illustrates another example structure of functional layers of an evolved node B (eNodeB) base station of the LTE system shown in FIGS. 1A-1D. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

One of the functions of the eNodeB 106 referred to in Layer 3 of FIG. 1C is radio resource management ("RRM"), which includes scheduling of both uplink and downlink air interface resources for user equipment 104, control of bearer resources, and admission control. The RRM function is to ensure efficient use of the available network resources. In particular, RRM in E-UTRAN provides a means to manage (e.g., the ME and assign, reassign, and release) radio resources in single and multi-cell environments. RM may be treated as a central application at the eNB responsible for interworking between different protocols (RC, S1AP, and X2AP) so that messages can be properly transferred to different nodes across Uu, S1, and X2 interfaces. RM may interface with operation and management functions in order to control, monitor, audit, or reset the status due to errors at a protocol stack. Radio admission control: The RAC functional module accepts or rejects requests for the establishment of new radio bearers.

The RRM includes modules for radio bearer control (RBC). The RBC functional module manages the establishment, maintenance, and release of radio bearers. The RRM also includes modules for connection mobility control (CMC) The CMC module manages radio resources in the idle and connected modes. In the idle mode, this module defines criteria and algorithms for cell selection, reselection, and location registration that assist the UE in selecting or camping on the best cell. In addition, the eNB broadcasts parameters that configure the UE measurement and reporting procedures. In the connected mode, this module manages the mobility of radio connections without disruption of services.

The RRM may also include modules for dynamic resource allocation (DRA) and/or packet scheduling (PS). The task of DRA or PS is to allocate and de-allocate resources (including physical resource blocks) to user and control-plane packets. The scheduling function typically considers the QoS requirements associated with the radio bearers, the channel quality feedback from the UEs, buffer status, inter-cell/intra-cell interference condition, and the like. The DRA function may take into account the restrictions or preferences on some of the available resource blocks or resource-block sets due to inter-cell interference coordination (ICIC) considerations.

The RRM may also include modules for inter-cell interference coordination (ICIC), load balancing, Inter-RAT radio resource management, and subscriber profile ID (SPID).

The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management.

The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

Wireless communication networks are widely deployed to provide various communication services such as voice, video, packet data, messaging, broadcast, or the like. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

As discussed above with reference to FIG. 1B, a wireless communication network may include a number of network entities, such as base stations, that can support communication for a number of mobile entities/devices, such as, for example, user equipments (UEs) or access terminals (ATs). A mobile entity may communicate with a base station via a downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a way to convey both data and control information between a base station, such as an evolved Node B (eNB), and a mobile entity, such as a UE, with increased spectral efficiency and throughput.

In the context of LTE, information may be delivered among network entities and mobile entities as media access control (MAC) protocol data units (PDUs) and radio link control (RLC) PDUs, wherein a given RLC PDU may include at least one RLC service data unit (SDU) or RLC SDU segment. In unicast, the maximum RLC SDU size is specified in a Packet Data Convergence Protocol (PDCP).

In general, a radio access network (RAN) implements a radio access technology. Conceptually, it resides between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), and so forth. The RAN functionality is typically provided by a silicon chip residing in a node such a eNodeB which resides between the CN and the UE. RAN is used by GSM/UMTS/LTE systems, e.g., for example, GERAN (GSM RAN), UTRAN (UMTS Terrestrial RAN), and E-UTRAN (Enhanced UTRAN) are the GSM, UMTS, and LTE radio access networks.

The radio access network including the base stations provided therein is responsible for handling all radio-related functionality including scheduling of radio resources. The core network may be responsible for routing calls and data connections to external networks.

The scheduler in a base station, such as an eNodeB, is generally responsible for assigning radio resources to all UEs and radio bearers both in uplink and downlink. The scheduler in an eNB allocates resource blocks (which are the smallest elements of resource allocation) to users for predetermined amounts of time. Generally, a resource block in an LTE system corresponds to one sub-carrier over one OFDM symbol. According to some implementations, a base station, such as an eNodeB, includes a video frame aware scheduler module within the base station.

Data packets in a communication network may correspond to video data in an encoded video bit-stream. For example, video data is typically encoded according to standards defined by the Moving Picture Experts Group (MPEG). These standards include, for example, MPEG-1, MPEG-2, MPEG-3, and MPEG-4 encoding schemes. These encoding schemes break down video data and reduce the amount of data transmitted by generally transmitting the differences between frames, rather than all of the data associated with a particular frame in a video sequence. During encoding, frames may generally be identified as an intra-coded frame (I-frame), a predicted frame (P-frame), or a bi-predictive picture (B-frame). An I-frame is typically a fully specified frame, such that the data provided describing the I-frame fully describes the pixel information corresponding to the static image represented in the frame. A P-frame typically only includes the changes in the image form a previous frame, rather than the data for the each of the pixels in the image corresponding to the P-frame. Similarly, a B-frame typically only includes the differences in the image relative to a previous and a subsequent frame. In this way, a B-frame can include even less data about for transmission than a P-frame. Prediction of P-frames and B-frames is performed by a decoder at a receiver of the video bit-stream, based on, for example, interpolation algorithms, motion-compensation algorithms, spatial prediction, or the like. The encoding and decoding scheme may correspond to, for example, that defined by the Advanced Video Coding H.264 standard.

Without knowledge of the video frame type coordination of communication of a data packet is provided in a generic fashion. At the base station, such as an eNodeB, assignment of resource blocks occurs at 1 ms intervals. Detection of packet data and corresponding video frame type outside of the base station, such as using devices in the core network or at the user device, cannot accurately account for changes in the radio channel conditions that occur at the 1 ms intervals at which the base station assigns resource blocks. For example, a base station, such as an eNodeB, may decide the type of modulation encoding scheme (MCS) for a data packet transmission, for example, using quadrature amplitude modulation QAM—including 16-QAM, 64-QAM, or the like) and/or quadrature phase shift keying (QPSK) every 1 ms. Such decisions are based on the channel conditions present during the time slice at which the base station is assigning the resource blocks.

Implementation of a video frame aware scheduling and/or transrating in the base station involves a software intensive system. In one example of the video frame awareness capability as will be described in greater detail below with reference to FIGS. 4-7, a Deep Packet Inspection (DPI) function supported in the eNodeB inspects video frames in every packet and marks them based on frame type. In doing so, the frame detection performed by the DPI function drives the treatment to be applied on the frame in question. As an example, if the frame is an I-frame, it will be marked appropriately, and the scheduler can select a relatively conservative modulation coding scheme (MCS) while transporting it. In case of B-frames, the packet inspection processor may determine whether the B-frame contains a large set of data (fast moving pictures) or not. Based on this determination, it marks the packet accordingly. The scheduler can select the modulation-coding scheme (MCS) according to the marking, which may indicate that the scheduler can be relatively aggressive in selecting the MCS if the frame contains a small amount of bits indicating that the loss of this B-frame won't affect the quality of experience of the viewer.

This type of DPI functionality implementation requires a particular hardware design and CPU capacity to sustain the compute demand on a per packet basis. Therefore, according to some implementations, in order to implement video frame aware scheduler and/or transrating function in the base station (e.g., eNodeB), the implementation of and requirements for a DPI capability are utilized to determine the base station design. As one implementation, with returned reference to FIG. 3, the base station for a macro network, such as a 3G or 4G LTE network, is split between the intelligent baseband unit (iBBU) 304 and intelligent RRH (iRRH) 302, such that the packet inspection would be performed by an actively cooled iBBU 304 which is separate from a passively cooled iRRH 302. Other implementations may also be provided utilizing processors that are capable of performing the software intensive packet inspection processes while complying with the thermal constraint of the processors and the entire node.

According to another implementation, a DPI capability may be implemented outside of the base station, e.g., at a Packet Data Network Gateway (PDN-GW), and/or a dedicated node designed to perform DPI in the core network or access network responsible for performing the packet inspection and marking of video frames. In this implementation, the markings of frame type based on the packet inspection may then be conveyed to the base station (e.g., eNodeB) in order to process the corresponding data packet accordingly. In this implementation, the time gap between inspection/marking of the data packet and frame type, and the processing by the base station is greater than in the implementation in which packet inspection occurs at the base station. Moreover, the core network nodes do not have base station (e.g., eNodeB) control plane (RRC) and Radio Resource Management (RRM) functionality to make an accurate determination or marking for a given packet. For example, knowledge of the level of radio resource availability which is in the RRM and the number of active users camped on a eNodeB which is in the RRC modules are essential for the packet inspection processor to make appropriate marking of the B or P frames in terms of MCS selection and reduction of bit rate.

Implementing the packet inspection at the base station as described according to some implementations overcomes these challenges by locating the DPI function and inspection determination functions performed such that it is performed by the same hardware that hosts the base station's control plane (RRC) and Radio Resource Management (RRM) functions.

According to some implementations, in order to accurately assign resource blocks based on the real-time channel conditions at the base station, and in order to reduce a video bit-stream without overly impacting the quality of the transmitted video, the base station includes a module and/or processor for inspecting the data packet, including the video frame type of the data packet. According to some implementations, the base station also includes a module and/or processor for scheduling and assigning resource blocks based on the determined video frame type. According to some implementations, the base station includes a module and/or processor for transrating the bit-stream based on the determined video frame type. According to some implementations, the base station includes both a module and/or processor for assigning resource blocks based on the determined video frame type and a module and/or processor for transrating the bit-stream which are in communication with one another in the base station. This video frame aware scheduling and/or transrating process is different than conventional scheduling mechanisms for at least the reason that conventional scheduling techniques do not take into account video frame type and do not conduct packet inspection at the base station.

Figure 4:
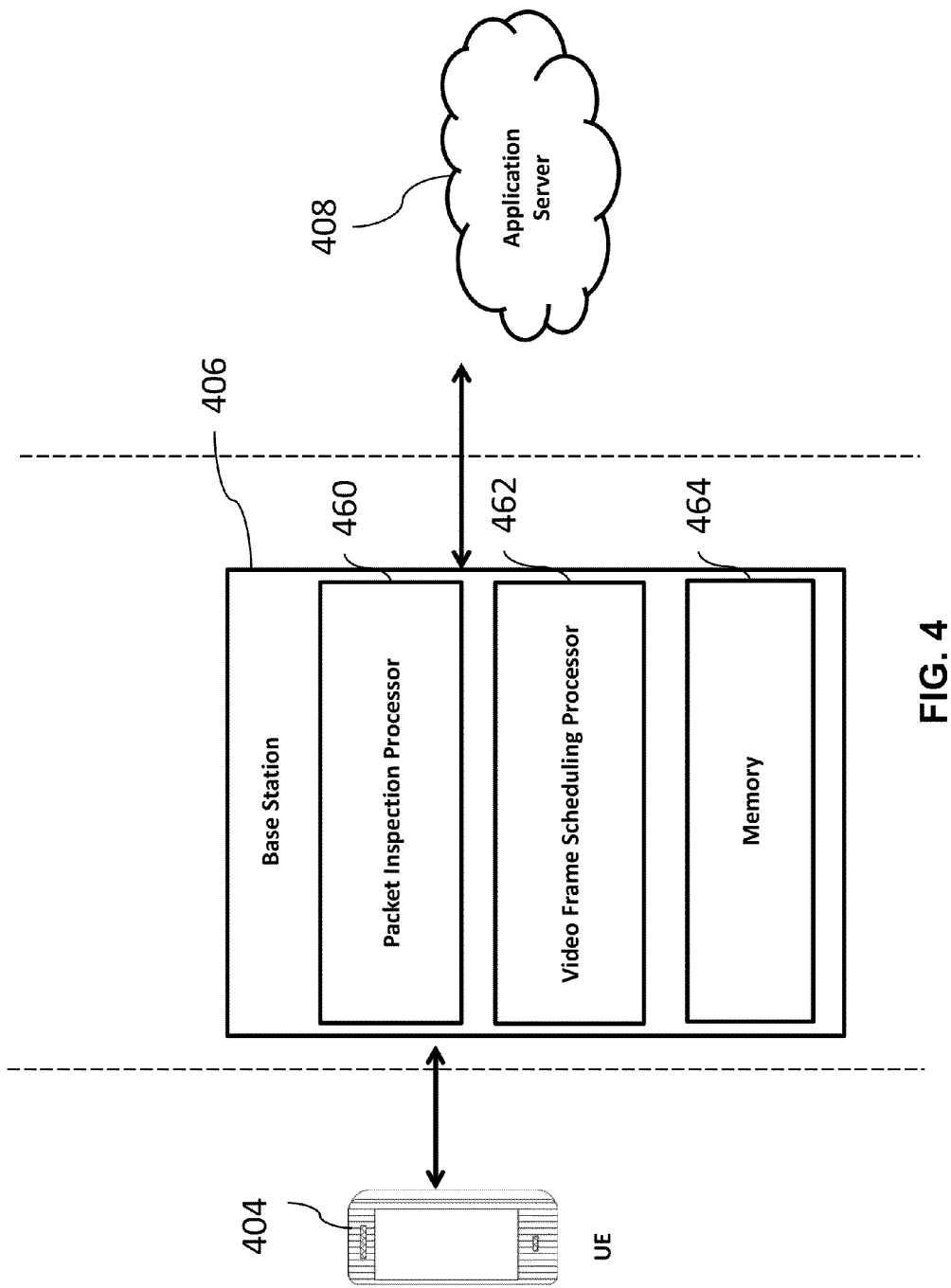
FIG. 4 illustrates an example of a base station for coordinating communication between a user equipment and a core network according to some implementations.

FIG. 4 illustrates an example of a base station 406 for coordinating communication between a user equipment 404 and a core network 408 according to some implementations. The base station 406 may correspond to an eNodeB, such as an eNodeB as shown and described above with reference to FIGS. 1B-1C, 2, and 3. In the case of a C-RAN architecture such as that shown in FIG. 3, the base station 406 may correspond to the intelligent baseband unit (iBBU) 304 as shown in FIG. 3. The base station 406 includes a packet inspection processor 460, a video frame scheduling processor 462, and a memory 464. While shown as separate components in FIG. 4, the packet inspection processor 460, the video frame scheduling processor 462, and the memory 464 may be integrated in one or more processing components. In some implementations, the packet inspection processor 460 and the video frame scheduling processor 462 may be provided as software modules in a processor that is specifically programmed to implement the functions described herein with reference to these processors.

In some implementations, the packet inspection processor 460 may include one or more server class CPUs (e.g., Intel Xeon®) or embedded CPUs (e.g., Cavium Octeon® or Broadcom XLP®). In some implementations, the video frame scheduling processor 462 may include one or more digital signal processors (DSPs), for example TI Keystone II® or Cavium Octeon Fusion® processors. The packet inspection processor 460 and video frame scheduling processor 462 may include software and/or firmware for programming these devices along with any hardware components (e.g., logic gates, accelerators, memory, or the like) that these processors may include.

In some implementations, the packet inspection processor 460 is configured to perform a packet inspection on each data packet that is transmitted between the user equipment 404 and the core network 408 in order to determine, for example the video frame type of the data packet in a video data bit-stream. A video frame type may correspond to, for example, an I-frame, a P-frame, a B-frame, or the like in an encoded video data bit-stream. The packet inspection may be one of a shallow packet inspection (SPI) and/or a deep packet inspection (DPI). A shallow packet inspection may be performed by inspecting one or more headers of the data packet to determine some information associated with the data packet. For example, the shallow packet inspection may inspect the IP header of the data packet in order to determine the source IP address of the data packet, and based on the source, may determine the type of video data (e.g., movie, clip, television show) that is being transmitted. Based on the shallow packet inspection, in some implementations, the packet inspection processor 460 may perform a deep packet inspection, for example by examining other layers of the data packet. For example, the deep packet inspection may include an inspection of one or more of layers 1-7 of an open systems interconnect (OSI) model data packet. In some implementations, the packet inspection processor 460 may inspect the payload of a data packet to determine how the data packet should be assigned a resource block by the video frame scheduling processor 462. In some implementations, the packet inspection processor 460 may be configured to perform shallow packet inspection for all incoming and outgoing packets, while performing deep packet inspection on a subset of packets based on the settings that are stored in or provided to the base station.

In some implementations, the packet inspection processor 460 may include an MPEG parser configured to inspect metadata associated with a data packet including video data. Based on the inspected metadata, as defined by the MPEG standard, the packet inspection processor 460 may determine the frame type of one or more video frames associated with the data packet.

The packet inspection processor 460 communicates the detected video frame type and/or other information that is derived from the data packet to the video frame scheduling processor 462. The packet inspection processor 462 may assign resource blocks based on predefined settings stored in memory 464 corresponding to the information detected through inspection of the data packet and based on the channel conditions of the communication link with the user equipment and/or the core network. The video frame scheduling processor 462 may take into account the video frame type, the number of video frames in the data packet, the provider of the content, the user device type or profile information associated with the user, Quality of Service (QoS) requirements for the data packet, a Channel Quality Indication (CQI) determined by the base station 406, a buffer status report (BSR) of the UE buffer, a power headroom report (PHR) from the UE, Channel State Information (CSI), and/or the video frame type marking performed by the packet inspection processor to perform video frame aware scheduling. In some implementations, the video frame scheduling processor 462 may allocate resources such that I-frames are transmitted more reliably than B-frames and/or P-frames.

For example, in an LTE or other telecommunication system, there are two types of evolved packet systems (EPS) bearers: the default EPS bearer and the dedicated EPS bearer. The default EPS bearer is established during the attach procedure and allocates an IP address to the UE that does not have a specific QoS (only a nominal QoS). A dedicated EPS bearer is typically established during call setup and after transition from idle mode to the connected mode for a specific purpose such as carrying video flows with a set QoS. It does not allocate any additional IP address to the UE and is linked to a specified default EPS bearer but has a specific QoS class. A QoS class identifier (QCI) is a scalar that may be used as a reference to access node-specific parameters that control bearer level packet forwarding (e.g., scheduling weights, admission thresholds, queue management thresholds, and link layer protocol configuration), and are preconfigured by the operator owning the access node (eNB). According to some implementations, (e.g., LTE based implementations), the video frame scheduling processor 462 manages video flows within a given bearer.

With returned reference to FIGS. 2 and 3, the packet inspection processor 460 may correspond to a function that is part of layer 3 functions in the base station 106, 306. In some implementations, the packet inspection processor 460 may also be provided on a separate functional layer from the functional layers described with reference to FIGS. 2 and 3. The packet inspection processor 460 may be configured to communicate and coordinate with other functions performed by the base station 406. For example, the packet inspection processor 460 may coordinate with the radio resource management (RRM) functions described above with reference to FIG. 2. As another example, the packet inspection processor 460 may interact with the RRM to gauge traffic load on the eNodeB and based on the traffic flow, modify the video frame markings. For example, during heavy load conditions the packet inspection processor 460 may mark the B-frames for processing with a default MCS, while during lighter load conditions mark the B-frames for processing with an MCS having greater redundancy.

In some implementations, the video frame scheduling processor 462 may be provided in layer 2 of the base station as shown in FIGS. 2 and 3. In those implementations in which functions of layer 2 are subdivided between the iBBU 306 and RRHs 302, the video frame scheduling processor 462 may be implemented as part of the layer 2 functions that remain with the iBBU 306. The video frame scheduling processor 462 may be configured to communicate and coordinate with other functions performed by the base station 406. In some implementations, the video frame scheduling processor 462 may coordinate with the MAC layer, and in particular the hybrid automatic repeat request (HARQ) manager of the MAC layer, as well as with a physical layer of the base station. For example, the video frame scheduling processor may receive information regarding the video frame type of the radio link control (RLC) protocol data units (PDUs). The video frame type may be appended to the data packet by the packet inspection processor 460 and the data packet may proceed to be processed at subsequent layers of the base station based on the appended information.

Figure 5:
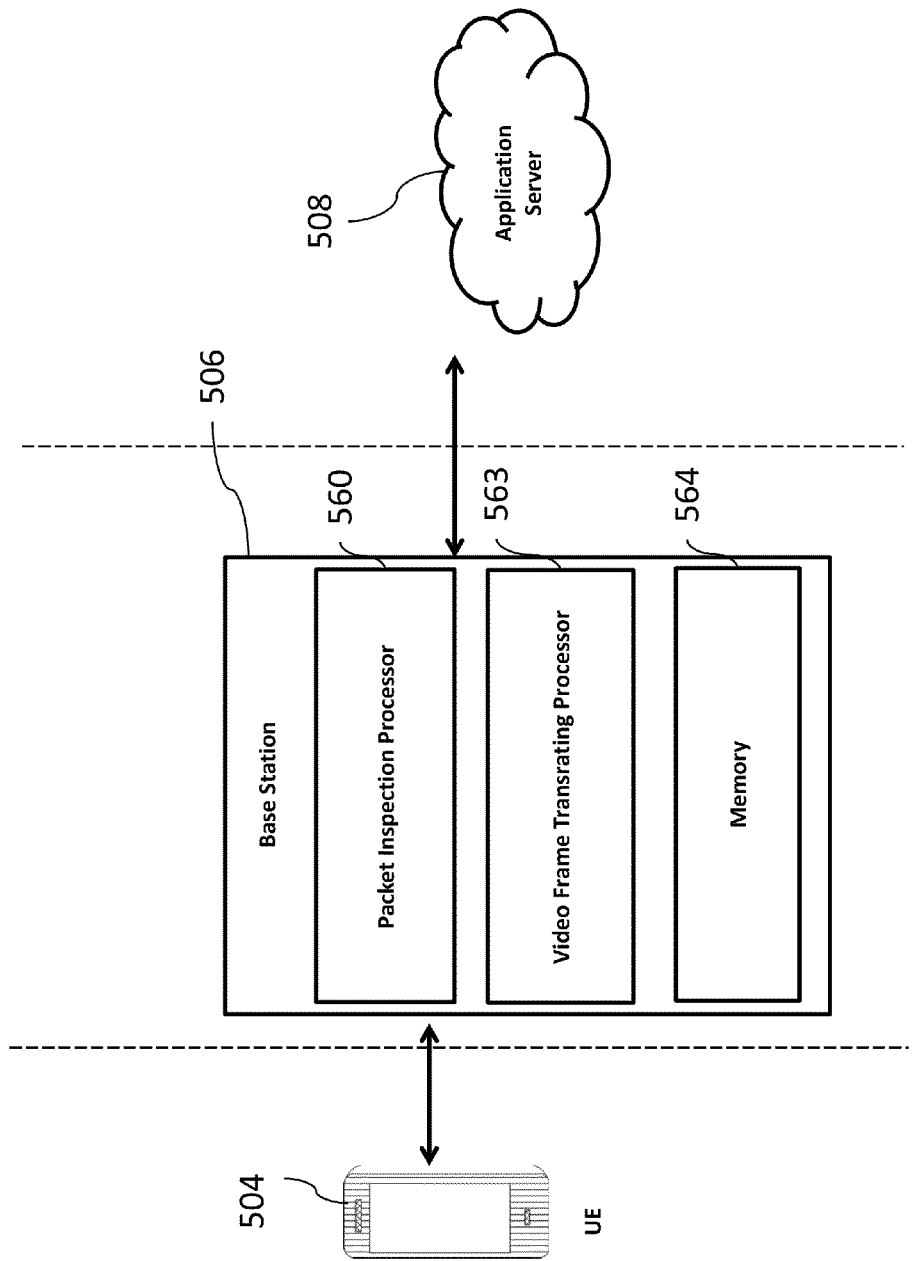
FIG. 5 illustrates another example of a base station for coordinating communication between a user equipment and a core network according to some implementations.

FIG. 5 illustrates another example of a base station 506 for coordinating communication between a user equipment 504 and a core network 508 according to some implementations. The base station 506 may include a packet inspection processor 560 and a memory 564 which are similar to the packet inspection processor 460 and memory 464 described above with reference to FIG. 4. The base station 506 may also include a video frame transrating processor 563. In some implementations, the video frame transrating processor 563 may include one or more digital signal processors (DSPs), for example TI Keystone II® or Multicore processors like Cavium Octeon Fusion® processors or Intel Xeon processor.

In general, transrating may refer to changing a bit rate of a video bit-stream without altering other properties of the encoded video data. For example, reducing a 1 Mbps video stream to a 512 Kbps video stream is performed through transrating by dropping video frames from the bit-stream. Transrating may be used to reduce bit rate within the same codec in order to, for example, reduce bandwidth consumption of the transmitted video bit-stream. In some implementations, the packet inspection processor 560 may perform a shallow packet inspection to determine that the data packet or a group of data packets corresponds to a video bit-stream, and the video frame transrating processor 563 may tranrate (e.g., reduce the bit rate of) the data packets without inspecting the video frame type of the data packets. For example, based on the type of coded video data, the data packet may not identify a particular frame type, and the base station may tranrate all data packets in the video bit-stream in the same manner based on an evaluation of the channel conditions.

In some implementations, transrating entails removing frames from the transmitted bit-stream or reducing a bit rate of a frame based on a detection of a video frame type. The removal of frames or reduction in bit-rate impacts the quality of the transmitted video, thereby impacting a user's experience. In some implementations, the packet inspection processor 560 may determine a video frame type of a video frame in the bit-stream, and append information identifying the video frame type to the data packet for subsequent processing as discussed above with reference to FIG. 4. The video frame transrating processor 563 may read the appended information identifying the video frame type, and determine whether to transrate (e.g., reduce bit rate), drop, or schedule the packet as is (e.g., without transrating) for transmission based on the determined frame type. For example, the video frame transrating processor 563 may transrate or drop some of the B-frames and/or P-frames in a video bit-stream, while scheduling all I-frames in the bit-stream without transrating for transmission. In some implementations, as will be described in greater detail below with reference to FIG. 6, the appended information indicating whether a frame should be transrated, dropped, or transmitted without modification (e.g., as is) may also be utilized by a scheduler in order to schedule a data packet for transmission based on the channel conditions.

Through the use of a video frame transrating processor 506, a video bit-stream may be transrated without overly reducing the quality of the transmitted video that is decoded by a user equipment 504. The video frame transrating processor 563 utilizes the knowledge of instantaneous radio channel conditions to avoid over-transrating or under-transrating, thereby improving user experience for transrated videos while reducing radio resource consumption.

Figure 6:
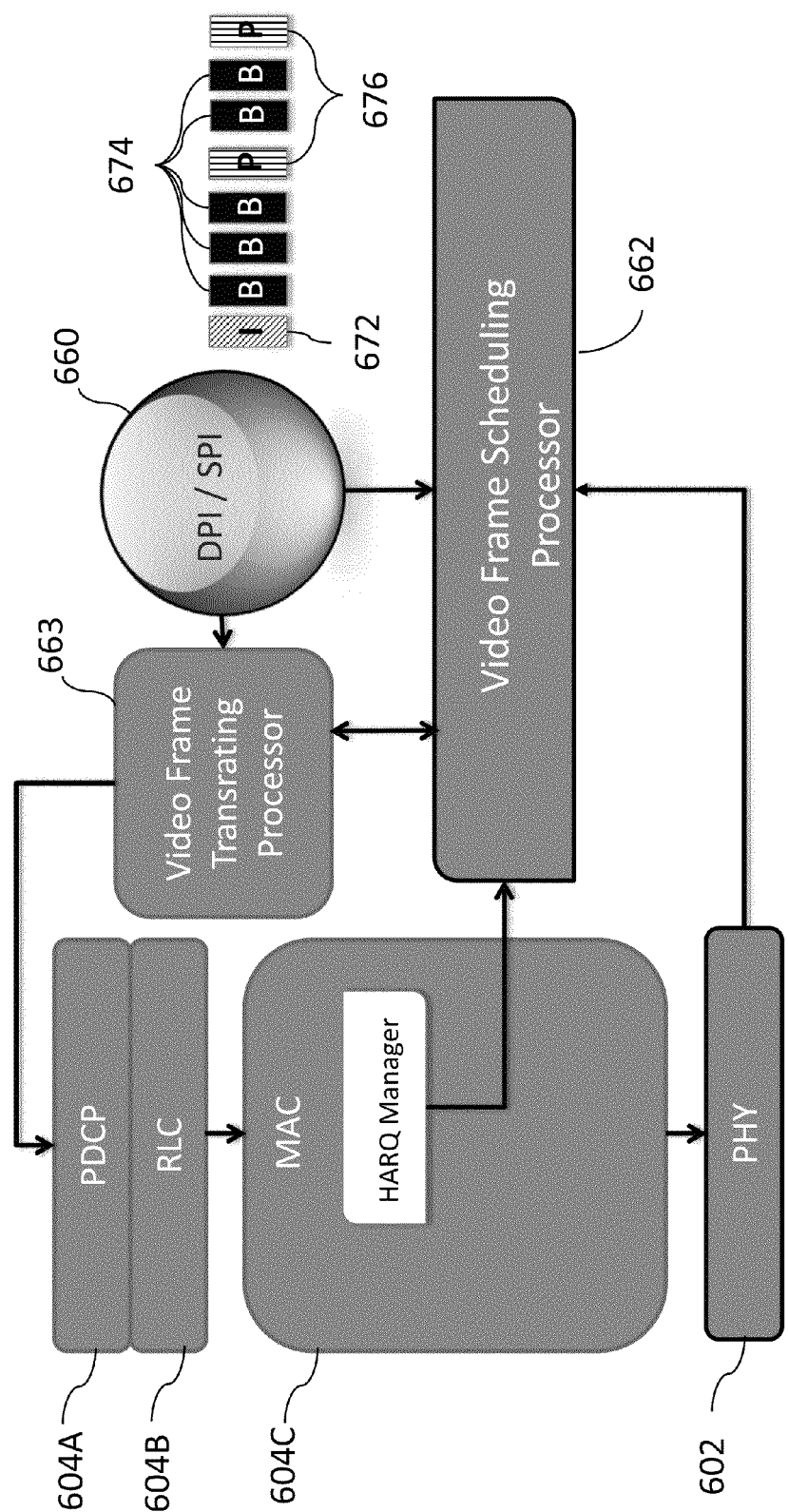
FIG. 6 illustrates an example of a video frame transrating processor and a video frame scheduling processor for coordinating transmission of a video bit-stream.

FIG. 6 illustrates an example of a video frame transrating processor 663 and a video frame scheduling processor 662 for coordinating transmission of a video bit-stream. The system shown in FIG. 6 illustrates portions of functional aspects of a base station as described above in processing a video bit-stream. The base station includes, for example, a PDCP layer 604A, RLC layer 604B, and MAC layer 604C including a HARQ manager. These layers 604A-604C are provided in Layer 2 of an eNodeB base station as illustrated and described with reference to FIG. 2. The base station also includes functions corresponding to a physical layer (PHY) 602 as described above with reference to FIG. 2. In some embodiments, the base station may correspond to the structure shown in FIG. 3, wherein the base station corresponds to an intelligent base band unit (iBBU) including at least some layer 2 functions and layer 3 functions, and wherein the iBBU is coupled to remote radio heads including at least some layer 2 functions and layer 1 functions.

A packet inspection processor 660 may be provided for inspecting the data packets to be transmitted and for determining the type of video frame associated with a data packet. For example, the packet inspection processor may perform Deep Packet Inspection (DPI) and/or Shallow Packet Inspection (SPI) on a bit-stream including I-frames 672, B-frames 674, and P-frames 676. The packet inspection processor 660 may be provided in Layer 3 of an eNodeB base station as illustrated and described with reference to FIG. 2. The packet inspection processor 660 may append information regarding the type of video frame to the data packet for subsequent processing, for example, by the video frame transrating processor 663 and/or video frame scheduling processor 662. In some implementations, the video frame transrating processor 663 may be may be provided in Layer 3 of an eNodeB base station, while the video frame scheduling processor 662 is provided in Layer 2 (e.g., within the MAC layer) of an eNodeB base station as illustrated and described with reference to FIG. 2.

The video frame transrating processor 663 may be configured to directly drop packets based on the detection of video frame type by the packet inspection processor 660. In some implementations, the video frame transrating processor 663 may append data to the packet (e.g., relative importance of the frame in the sequence of frames) which may be used to subsequently schedule the data packet by the video frame scheduling processor 662. The video frame scheduling processor 662 may assign resource blocks based on the information appended by the packet inspection processor and/or the video frame transrating processor 663 such that, for example, I-frames are transferred more reliably than P-frames and/or B-frames as discussed above.

Figure 7:
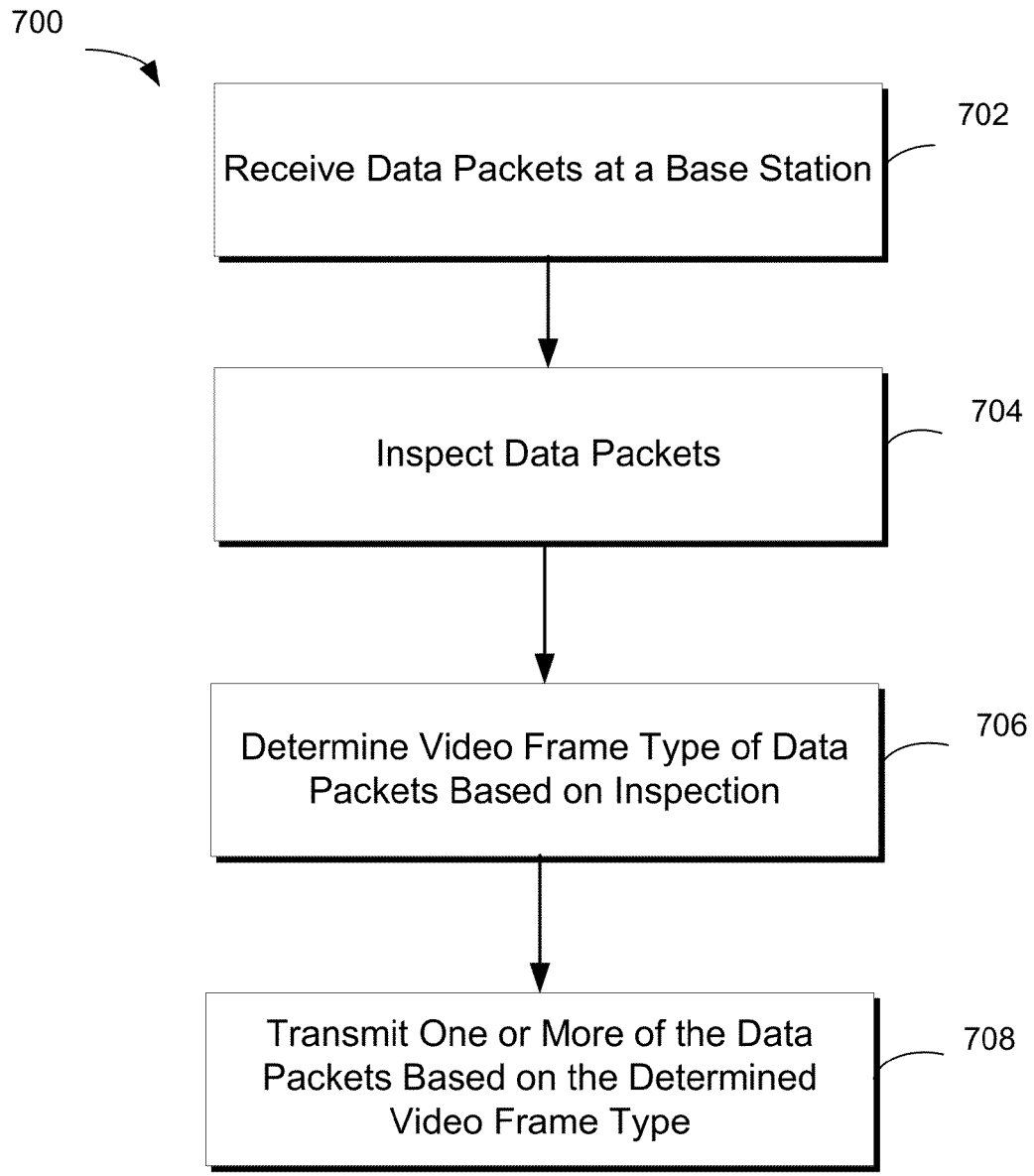
FIG. 7 is a flowchart of a method of coordinating communication between a user equipment and a core network using a base station according to some implementations.

FIG. 7 is a flowchart of a method of coordinating communication between user equipment and a core network using a base station according to some implementations. The method 700 shown in FIG. 7 may be performed, for example, by a base station as shown and described with reference to FIGS. 4-6. As shown in FIG. 7, the method 700 includes receiving a data packet at a base station as represented by block 702. The base station may correspond to an eNodeB base station in an LTE network as described above. At block 704, the data packets are inspected. For example, a shallow packet inspection and/or a deep packet inspection of the packet may be performed, including, for example, MPEG parsing data packets corresponding to a video data bit-stream. At block 706, the frame type of the inspected data packets are determined. For example, it is determined whether each data packet includes an I-Frame, a P-Frame, and/or a B-Frame. At block 708, one or more of the data packets are transmitted based on the determined video frame type. For example, as discussed above with reference to FIGS. 4-6, a data packet may be scheduled by a video frame scheduling processor based on the detected frame type of a video frame encoded in the data packet. In some implementations, as discussed above, a video frame transrating processor may be configured to reduce a bit rate (e.g., transrate) or drop one or more of the data packets from the video-bit stream in order to reduce the bandwidth of the bit-stream. The decision of which data packets to drop is based on the determined video frame type of the data packets, such that I-frames are maintained while B-frames may be transrated or dropped and P-frames may be transrated as discussed above.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc.

A TDMA network may implement a radio technology such as Global System for Mobile Communications (GSM). An OFDMA network may implement a radio technology such as Long Term Evolution (LTE), Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS).

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency.

In some aspects the teachings herein may be employed in a network that includes macro scale coverage (e.g., a large area cellular network such as a 3G or 4G LTE network, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

A wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The various illustrative logical blocks, modules, and circuits described in connection with the aspects disclosed herein and in connection with FIGS. 1A-D, and 2-6 may be implemented within or performed by an integrated circuit (IC). The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A base station for coordinating communication of data packets between a user device and an application server, the data packets corresponding to a bit-stream of encoded video data, the base station comprising:
- a memory; and
- a computer processor operatively coupled to the memory, to a radio transmitter, and to a radio receiver, the computer processor being configured to perform the following operations:
  - detecting a video frame type of the data packets;
  - determining, based on the detected video frame type of a data packet, a rate of transmission for the data packet using a video frame transrating processor, the video frame transrating processor determining whether a data packet will be transmitted without modification, transmitted with a reduced bit rate, or removed from the video bit-stream based on the detected video frame type;
  - assigning, based on the determined rate of transmission, at least one resource block for transmission of the data packet; and
  - transmitting, using the assigned at least one resource block and the determined rate of transmission, one or more of the plurality of data packets.

2. The base station of claim 1, wherein the computer processor is further configured to assign resource blocks for transmitting one or more of the plurality of data packets.

3. The base station of claim 2, wherein computer processor is configured to inspect data packets and assign resource blocks to data packets upon arrival at the base station.

4. The base station of claim 1, wherein the computer processor is configured to transmit the data packet to a remote radio head, and wherein the remote radio head comprises the radio transmitter and the radio receiver.

5. The base station of claim 1, wherein the computer processor is configured to perform a shallow packet inspection of the data packet, and based on the shallow packet inspection, perform a deep packet inspection of the data packet.

6. The base station of claim 5, wherein the shallow packet inspection comprises inspecting an IP header of the data packet, and wherein a deep packet inspection comprises inspecting a payload of the data packet.

7. The base station of claim 1, wherein the computer processor comprises a packet inspection processor configured to inspect at least one of a packet header, a packet payload, and metadata associated with the data packet to determine the video frame of the data packet, and a video frame scheduling processor configured to assign resource blocks for transmitting the one or more data packets based on the detected video frame type.

8. The base station of claim 1, wherein the computer processor comprises a video frame scheduling processor configured to assign resource blocks for transmitting the one or more data packets based on the detected video frame type.

9. The base station of claim 8, wherein the video frame scheduling processor is configured to assign greater resources for transmitting an I-frame than for a P-frame in the video bit-stream.

10. The base station of claim 8, wherein the video frame scheduling processor is configured to assign greater resources for transmitting an I-frame than for a B-frame in the video bit-stream.

11. The base station of claim 1, wherein the video frame transrating processor is configured to transmit all I-frames in the bit-stream without modification and reduce a bit rate of or drop at least one B-frame from the bit-stream.

12. The base station of claim 1, wherein the video frame transrating processor is configured to transmit all I-frames in the bit-stream without modification and reduce a bit rate for at least one P-frame from the bit-stream.

13. The base station of claim 1, wherein the video frame transrating processor is configured to append information identifying whether a data packet may be removed from the bit-stream, and wherein the computer processor further comprises a video frame scheduling processor configured to schedule the data packet for transmission based on detected radio channel conditions at the base station.

14. A computer-implemented method for coordinating communication of data packets between a user device and an application server utilizing a base station, the data packets corresponding to a bit-stream of encoded video data, the method comprising:
- detecting a video frame type of the data packets;
- determining, based on the detected video frame type of a data packet, a rate of transmission for the data packet using a video frame transrating processor, the video frame transrating processor determining whether a data packet will be transmitted without modification, transmitted with a reduced bit rate, or removed from the video bit-stream based on the detected video frame type;
- assigning, based on the determined rate of transmission, at least one resource block for transmission of the data packet; and
- transmitting, using the assigned at least one resource block and the determined rate of transmission, one or more of the plurality of data packets;
- wherein of the detecting, the determining, the assigning and the transmitting is performed by at least one processor of at least one computing system.

15. The method of claim 14, comprising assigning resource blocks for transmitting one or more of the plurality of data packets.

16. The method of claim 14, comprising inspecting data packets and assigning resource blocks to data packets upon arrival at the base station.

17. The method of claim 14, comprising transmitting the data packet to a remote radio head, and wherein the remote radio head comprises a radio transmitter and a radio receiver.

18. The method of claim 14, comprising performing a shallow packet inspection of the data packet, and based on the shallow packet inspection, performing a deep packet inspection of the data packet.

19. The method of claim 14, wherein the shallow packet inspection comprises inspecting an IP header of the data packet, and wherein a deep packet inspection comprises inspecting a payload of the data packet.

20. The method of claim 14, comprising determining a radio channel condition and assigning resource blocks for transmitting the one or more data packets based on the detected video frame type.

21. The method of claim 14, comprising assigning greater resources for transmitting an I-frame than for a P-frame in the video bit-stream.

22. The method of claim 14, comprising assigning greater resources for transmitting an I-frame than for a B-frame in the video bit-stream.

23. The method of claim 14, comprising transmitting a data packet without modification, reducing the bit rate of the data packet, or dropping the data packet based on the detected video frame type.

24. The method of claim 14, comprising transmitting all I-frames in the bit-stream without modification and reducing the bit rate of or dropping at least one B-frame from the bit-stream.

25. The method of claim 14, comprising transmitting all I-frames in the bit-stream without modification and reducing a bit rate of at least one P-frame from the bit-stream.

26. The method of claim 14, comprising appending information identifying whether a data packet may be removed from the bit-stream, and scheduling the data packet for transmission based on detected radio channel conditions at the base station.

27. A non-transitory computer readable medium having stored thereon a computer program product that is capable of being executed by computer processing circuitry, the computer program product including instructions for causing the processing circuitry to:
  detect a video frame type of each of a plurality of data packets in a video bit-stream received by a base station;
  determine, based on the detected video frame type of a data packet, a rate of transmission for the data packet using a video frame transrating processor, the video frame transrating processor determining whether a data packet will be transmitted without modification, transmitted with a reduced bit rate, or removed from the video bit-stream based on the detected video frame type;
  assign, based on the determined rate of transmission, at least one resource block for transmission of the data packet; and
  transmit, using the assigned at least one resource block and the determined rate of transmission, one or more of the plurality of data packets.

28. The non-transitory computer-readable medium of claim 27, wherein the computer program product includes instructions for causing the processing circuitry to transmit a data packet without modification, reduce the bit rate of the data packet, or drop the data packet based on the detected video frame type.

29. The non-transitory computer-readable medium of claim 27, wherein the computer program product includes instructions for causing the processing circuitry to assign resource blocks for scheduling the data packets for transmission based on the detected video frame type.

* * * * *